Inventors
Edsel H. Sipinen
William A. Gartland
By McCanna, Morsbach & Pillote
Attorneys

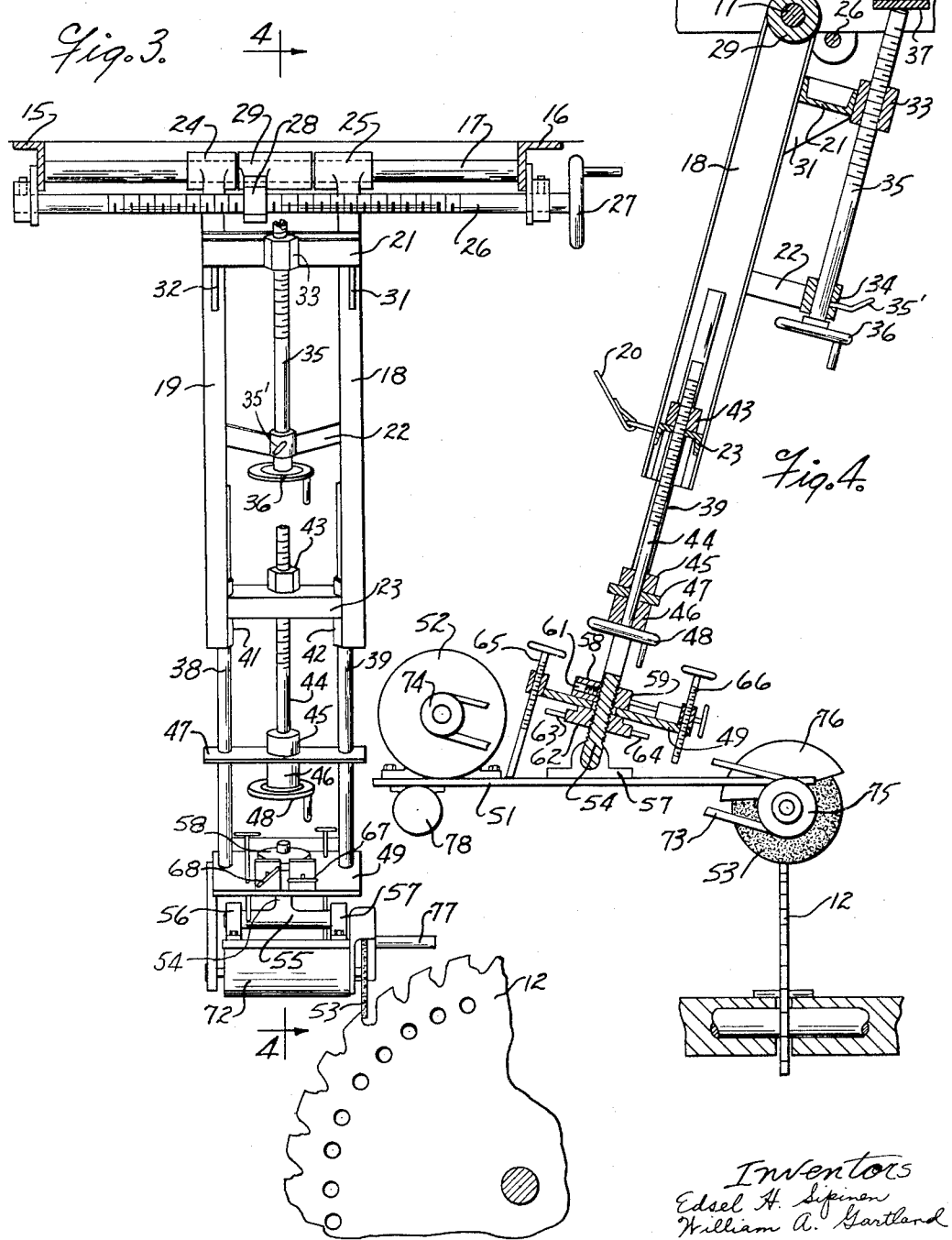

United States Patent Office 3,139,774
Patented July 7, 1964

3,139,774
SAW SHARPENING APPARATUS
Edsel H. Sipinen and William A. Gartland, both of Rte. 1,
Gladstone, Mich.
Filed July 5, 1963, Ser. No. 292,935
5 Claims. (Cl. 76—40)

This invention relates to apparatus for sharpening saws and more particularly for the sharpening of circular saws of the large sizes that are used as head saws for sawing logs.

For such an operation, it is an advantage from the standpoint of time saving, to have the saw sharpening equipment ready at hand so that when an opportunity arises for sharpening the saw, during shut down periods, the saw sharpening equipment can be placed in operation in a few minutes. For this purpose, the apparatus of this invention is suspended above the head saw in such a manner that, when not in use, it may be swung out of the way up against the roof or ceiling. But when its use is desired, it may be swung down into a position adjoining the upper edges of the circular saw.

In view of the fact that circular saws of different diameters will from time to time be mounted in a single mill as head saws, it is also important to provide in this saw sharpening apparatus means for adjusting the device so that its grinding wheel may be presented efficiently to the teeth of saws of different diameters.

The general object of the invention is to provide saw tooth sharpening apparatus which may be suspended above a large circular saw and provided with adjustments for presenting the grinding wheel to the teeth of the saw in such manner that all teeth may be ground in identical fashion with respect to depth of gullet, hook angle and the face angle of the teeth.

Another object of the invention is to provide in the above-described apparatus means whereby the apparatus does not require readjustment each time the grinding wheel is presented to another tooth.

Another object of the invention is to mount the grinding wheel so that it may be pivotally moved out of the way of the teeth as the saw is rotated to bring another tooth into position for being ground.

Another object of the invention is to provide, in a saw filing apparatus adapted for suspension above and adjoining a circular saw, means for mounting a grinding wheel and adjusting its position on the apparatus so that the wheel may be presented repetitively to the teeth of the saw conveniently and quickly by a simple pivotal movement in such manner as to facilitate uniformity in the grinding of the teeth.

Other objects and advantages of the invention will be mentioned hereinafter or will become apparent from a perusal of this specification.

In the drawings, FIGURE 1 is a perspective view showing the apparatus of the invention suspended in operative position above a circular saw;

FIG. 3 is a front elevational view of the apparatus, and

FIG. 4 is a sectional view of the same apparatus, substantially on the line 4—4 of FIG. 3, showing it in position for grinding saw teeth.

Figures 1, 2:
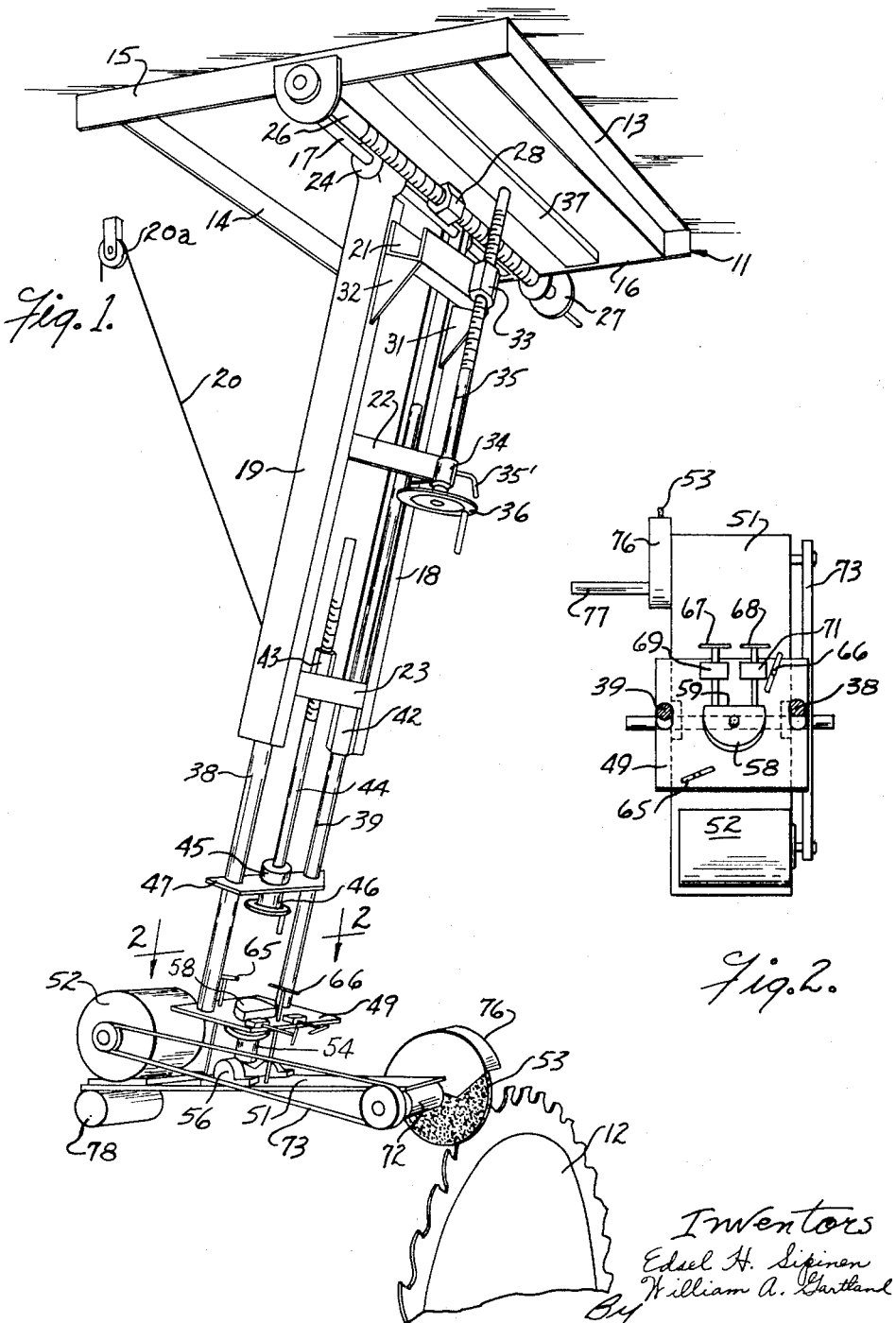
FIG. 2 is a view, partly in section, taken on the plane of the line 2—2 of FIG. 1.

Referring further to the drawings, there is shown in FIG. 1, a hanger frame generally indicated as 11, suitable for securing permanently to the roof structure or any other suitable overhead support in a saw mill just above the head saw 12, or other saw. This hanger frame includes side members 13 and 14 and end members 15 and 16, suitably secured together in a rigid manner.

Mounted on the hanger frame in any suitable conventional manner is a cylindrical rod 17 upon which the remainder of the apparatus is swingably or pivotally supported. A depending frame, having vertical side members 18 and 19 and suitable cross braces 21, 22 and 23, is secured to the sleeves 24 and 25 which are mounted on the rod 17 both for pivotal movement relatively thereto and sliding movement on the rod. Preferably, the hanger frame will be so mounted on the roof structure that its rod 17 will be parallel to the plane of the saw and also preferably horizontal.

Likewise, supported on the hanger frame is a threaded shaft 26 rotatably supported on the frame and capable of being rotated by means of the hand wheel 27. This threaded rod 26 passes through and is threadedly engaged with a nut 28 which is welded to a third sleeve 29 slidably mounted on the shaft 17 between and abutting the sleeves 24 and 25. Accordingly, when the wheel 27 is manually rotated, the depending frame will be propelled slidably along the rod 17. The purpose of this movement, as will be better understood later, is to permit the operator to align the grinding wheel with the teeth of the saw so that a desired "hook" angle may be ground on the saw teeth.

Referring particularly to FIG. 4, the upper cross brace 21 is in the form of a U-shaped channel iron which is supported on brackets 31 and 32, being preferably welded to them, and on the outer face of this channel iron 21 is welded an internally threaded nut 33. The lower cross brace 22 supports a sleeve 34, welded thereto. A threaded shaft 35 mounted as shown, carries on its lower end a hand wheel 36 which may be operated manually to advance or retract the screw 35 against a plate 37 which is fixedly supported on the hanger frame. Thus, as may be noted in FIG. 4, the screw 35 may be employed to alter and to determine a minimum angle of inclination of the depending frame 18–19 such as will position the grinding wheel more or less centrally just above the teeth of the circular saw. However, the screw 35 does not prevent the angle of inclination of the depending frame from being increased when it is desired to swing the grinding wheel away from the saw teeth or cause it to rotate back and forth across the face of the teeth. A set screw 35' is provided as shown for locking the shaft 35 at any desired position. A means such as a cable 20 is conveniently provided for swinging the saw sharpening apparatus out of the way when not in use and, as shown in FIG. 1 is attached by an eye to the cross member 23 and is entrained over a pulley 20a on the overhead structure which supports the frame 11.

Supported for vertical adjustability on the swingable depending frame is an assembly for supporting the grinding wheel which may be regarded as a third frame.

Mounted on the side frame members 18 and 19 of the swingable frame for vertical sliding movement are a pair of rods 38 and 39, slidable through bushings 41 and 42 which may be welded inside of the U-shaped channel irons 18 and 19. On the cross brace 23, there is welded a threaded nut 43 with which is engaged a rotatable threaded shaft 44 rotatably guided by a pair of bushings 45 and 46 secured to a cross brace 47 connecting the rods 38 and 39. The lower end of the threaded shaft 44 is provided with a hand wheel 48 by means of which the shaft may be rotated causing the rods 38 and 39 to telescope within the frame members 18 and 19, or be further extended therefrom, as may be desired to raise and lower the grinding wheel to accommodate saws of different diameter.

The lower ends of the rod 38 and 39 are secured, as by welding, or otherwise, to a rigid plate 49 which may be herein termed an adjusting table. To this table 49 is adjustably connected a platform 51 on which are mounted and operatively connected together the motor 52 and the grinding wheel 53.

The table 49 and a platform 51 are pivotally connected together as follows. A stub shaft 54, threaded throughout its length extends rotatably through a suitable aperture in the plate 49 and is formed integrally with a horizontal shaft 55 which is rotatably supported in a pair of pillow blocks 56 and 57. A disk 58 having a flat side 59 (FIG. 2) is threaded onto the upper end of the stub shaft 54 and is locked thereon by means of a set screw 61. Another disk 62, having radially protruding operating handles 63 and 64 is threaded on the stub shaft 54 underneath the table 49 and when these two disks are brought tightly against the table 49 to clamp it between them, the table 49 is rendered for the time being nonrotatable about stub shaft 54.

The tilting of the platform 51 relatively to table 49 can be limited by means of the manually operable screws 65 and 66. In setting up the apparatus for grinding the teeth on a saw, the operator turns the screw 65 down against the rear end of the platform to limit downward swinging movement of the grinding wheel to thereby control the depth of the tooth gullet, and the operator withdraws the screw 66 away from the front end of the platform sufficiently so that the grinding wheel may be lifted over the teeth of the saw when it is desired to advance the saw from one tooth to the next for grinding purposes. Thus, the screw 65, cooperating with the other parts of the apparatus, determines the depth at which the gullet will be ground.

As best shown in FIG. 2, provision is made for adjustably and very accurately rotating the platform 51 about the stub shaft 54 relative to the adjusting table 49 and the swingable depending frame. A pair of manually operated screws 67 and 68, threaded through blocks 69 and 71 welded to the table 49, are brought to bear against the flat side 59 of the upper disk 58, and are normally held screwed tightly against that flat side. However, when it is desired to rotate the platform about the stub shaft 54, the lower disk 62 will be unlocked by backing it away from the table 49 after which one screw 67 or 68 may be retracted and the other advanced to rotate disk 58 the desired amount, which will present the grinding wheel to the saw teeth faces at a different angle. Subsequently, disk 62 will be tightened against table 49. Ordinarily, and in perhaps most cases, the grinding wheel side face will be exactly perpendicular to the plane of the saw in order to grind the teeth straight across, but if some other grinding angle should be desired, this apparatus makes such a grinding possible. In any event, whatever angle is determined upon, the adjustable features of this assembly are such that that angle may be rigidly maintained uniformly, during the grinding of tooth after tooth.

The shaft supporting the grinding wheel will preferably be mounted underneath the platform 51 in a suitable journal 72, and a belt 73 connected with the motor pulley 74 and with the grinding wheel pulley 75 will enable the motor to drive the grinding wheel. Preferably, a guard 76 will be placed above the upper edge of the grinding wheel and from this may be extended a handle 77 for the convenience of the operator in applying the grinding wheel to the saw teeth. If a counterweight is needed for attachment to the motor end of the platform, such a weight 78 may be applied as shown and shifted back and forth on the platform as may be needed to achieve the desired balance.

From the foregoing it will be seen that the screw 35 is adjusted to position the grinding wheel over the saw blade, and the screw 44 is adjusted to raise or lower the grinding wheel to position the grinding wheel at the proper height for the particular size saw being sharpened. It will be perceived that the screw 65 may be adjusted so that the grinding wheel may repetitively grind the gullets of all the teeth to a uniform depth. The screw 26 on the hanger frame, as explained heretofore, is adjusted to shift the grinding wheel along a path paralleling the plane of the saw blade to a position offset from a vertical plane through the saw axis, as shown in FIG. 3, to enable the operator to determine the hook angle to be ground on each tooth of a saw of a given diameter. It is contemplated that a skilled and experienced operator will advance the head saw one tooth at a time manually, although if desired, some mechanism could be provided for rotating the circular saw through a definite angle for each grinding operation. However, a skilled operator should not need such additional mechanism, as he can with this apparatus grind the saw teeth uniformly and accurately to a desired pattern. A saw thus sharpened can cut lumber straight and true to desired dimensions.

The rigid swingable assembly which includes the pivotally hung side frame members 18 and 19 and the rods 38 and 39 connected in telescoping relation with 18 and 19 may also be regarded as a single vertically extensible swingable frame, on which the grinding wheel and motor are supported. The table 49 which is rigidly secured to the lower ends of the rods 38 and 39 may also be regarded as part of this extensible frame.

It should be understood that the embodiment of the invention herein described has been selected for illustrating the nature of the invention and the manner of its operation. However, other modifications and variations may be employed without departing from the spirit and scope of the invention as defined in the appended claims.

Having shown and described our invention, we claim:

1. An apparatus for sharpening circular saws comprising, an overhead frame adapted for mounting on a support therefor at a position generally overhead of the saw to be sharpened, a swingable depending frame pivotally mounted to the overhead hanger frame for swinging in an arc perpendicular to the plane of the saw, manually operable means for adjustably shifting the depending frame relatively to the hanger frame along a path paralleling the swinging axis of the depending frame, a first support mounted to the lower end of the swingable depending frame, a second support, means including a pivot member pivotally mounting the second support intermediate its ends to the first support whereby the ends of the second support are movable vertically and horizontally, a grinding wheel mounted on an end of the second support, a motor for operating the grinding wheel mounted on an opposite end of the second support whereby the motor tends to counter-balance the grinding wheel, at least one rigid member adjustably mounted on one of the supports and extending to contact the other support thereby adjustably limiting the movement of the end supporting the grinding wheel whereby the depth of a tooth gullet in a saw is controlled, and at least one element adjustably mounted on one of the supports for restrictive engagement with the pivot member thereby limiting the horizontal movement of the end supporting the grinding wheel whereby the latter is presented to a saw tooth at a proper angle.

2. An apparatus for sharpening circular saws comprising, an overhead frame adapted for mounting on a support therefor generally overhead of the saw to be sharpened, a swingable depending frame pivotally mounted to the overhead hanger frame for swinging in an arc perpendicular to the plane of the saw, manually operable means for adjustably shifting the depending frame relatively to the hanger frame along a path paralleling the swinging axis of the depending frame, a first support mounted to the lower end of the swingable depending frame, a second support, means including a pivot member mounting the second support intermediate its ends to the first support, said pivot member having a first pivot axis generally parallel to the axis of the swingable depending frame and having a second pivot axis generally perpendicular to the first axis whereby the ends of the second support are movable vertically and horizontally, a grinding wheel mounted on an end of the second support, a motor for operating the grinding wheel mounted on an opposite end of the second support whereby the motor tends to counter-balance the grinding wheel, at least one rigid member adjustably mounted on one of the supports and extending to engage the other support thereby adjustably limiting the movement of the end supporting the grinding wheel whereby the depth of a tooth gullet in a saw is controlled, and at least one element adjustably mounted on one of the supports for restrictive engagement with the pivot member thereby limiting the horizontal movement of the end supporting the grinding wheel whereby the latter is presented to a saw tooth at a proper angle.

3. An apparatus for sharpening circular saws comprising, an overhead hanger frame adapted for mounting on a support therefor at a position generally overhead of the saw to be sharpened, a swingable depending frame pivotally mounted to the overhead hanger frame for swinging in an arc perpendicularly to the plane of the saw, manually operable means for adjustably shifting the depending frame relatively to the hanger frame along a path paralleling the swing axis of the depending frame, a track secured on the overhead hanger frame generally paralleling the swing axis of the depending frame, a threaded member secured to the swingable depending frame, a manually operable elongate member threadedly engaged with said threaded member and having an end for slidable engagement with the track whereby the swingable depending frame may be restricted in movement in its arc without being restricted from shiftable movement along the path paralleling the swing axis of the depending frame, and sharpening means connected to the lower end of the swingable depending frame.

4. An apparatus for sharpening circular saws comprising, an overhead hanger frame adapted for mounting on a support therefor at a position generally overhead of the saw to be sharpened, a swingable depending frame pivotally mounted to the overhead hanger frame for swinging in an arc perpendicularly to the plane of the saw, manually operable means for adjustably shifting the depending frame relatively to the hanger frame along a path paralleling the swing axis of the depending frame, a track secured on the overhead hanger frame generally paralleling the swing axis of the depending frame, a threaded member secured to the swingable depending frame, a manually operable elongate member threadedly engaged with said threaded member and having an end for slidable engagement with the track whereby the swingable depending frame may be restricted in movement in its arc without being restricted from shiftable movement along the path paralleling the swing axis of the depending frame, a first support mounted to the lower end of the swingable depending frame, a second support, means including a pivot member pivotally mounting the second support intermediate its ends to the first support whereby the ends of the second support are movable vertically and horizontally, a grinding wheel mounted on an end of the second support, a motor for operating the grinding wheel mounted on an opposite end of the second support whereby the motor tends to counter-balance the grinding wheel, at least one rigid member adjustably mounted on one of the supports and extending to contact the other support thereby adjustably limiting the movement of the end supporting the grinding wheel whereby the depth of a tooth gullet in a saw is controlled, and at least one element adjustably mounted on one of the supports for restrictive engagement with the pivot member thereby limiting the horizontal movement of the end supporting the grinding wheel whereby the latter is presented to a saw tooth at a proper angle.

5. An apparatus for sharpening circular saws comprising an overhead hanger frame adapted for mounting on a support therefor generally overhead of the saw to be sharpened, a swingable depending frame pivotally mounted to the overhead hanger frame for swinging in an arc perpendicular to the plane of the saw, a first support mounted to the lower end of the swingable depending frame, a second support means including a pivot member mounting the second support at a point spaced from one end of the second support on the lower end of the first support, said pivot member having a first pivot axis disposed generally parallel to the axis of the swingable depending frame and having a second pivot axis generally perpendicular to the first axis whereby said one end of the second support is respectively swingable vertically and horizontally about said second and first pivot axes, a grinding wheel mounted on said one end of the second support, a motor for operating the grinding wheel mounted on the second support, at least one manually operable rigid member adjustably mounted on one of the supports and extending to engage the other support thereby adjustably limiting downward swinging movement of said one end of the second support which supports the grinding wheel whereby the depth of the tooth gullet in a saw is controlled, at least one manually operable element adjustably mounted on one of the supports for restrictive engagement with the pivot member thereby limiting horizontal swinging movement of said one end of the second support which supports the grinding wheel whereby the latter is presented to a saw tooth at a proper angle, and manually operable means for adjustably shifting the grinding wheel along a path generally paralleling the plane of the saw to be sharpened to adjust the hook angle ground on the saw teeth.

References Cited in the file of this patent
UNITED STATES PATENTS

| | | |
|---|---|---|
| 95,391 | Spratt | Sept. 28, 1869 |
| 105,543 | Borthwick | July 19, 1870 |
| 183,931 | Howland | Oct. 31, 1876 |
| 1,117,595 | Oatley | Nov. 17, 1914 |
| 2,067,179 | Elder | Jan. 12, 1937 |